Feb. 7, 1967     J. POPA     3,302,323
PLANT TREATMENT SYSTEM
Filed Jan. 31, 1964

INVENTOR.
JOSEPH POPA
BY Williams, David,
Hoffmann & Yount
ATTORNEYS 3,302,323
PLANT TREATMENT SYSTEM
Joseph Popa, Box 16, R.D. 1, Valley City, Ohio 44280
Filed Jan. 31, 1964, Ser. No. 341,538
1 Claim. (Cl. 47—9)

This invention relates to a plant treatment system for delivering materials to growing plants and, particularly, relates to a system for delivering fluid materials, such as plant food, water, or fumigants to plants which have the soil around the plant covered by a mulch.

It is common in the growing of plants to use a mulch to cover the soil around the plant roots in order to minimize evaporation of fluids and particularly moisture from the soil. One such mulch now in use comprises sheet-like material and, particularly, a sheet of black plastic material which is used to cover the soil surrounding the plant. The use of such sheet-like plastic material not only provides for maintaining the moisture in the ground surrounding the plant, but also prohibits the growth of weeds between the plants. The plastic sheet also adds to the cleanness of the fruit and foliage on the plants since there is no splashing of dirt onto the plant when it rains.

While mulches as above noted, and particularly the plastic sheet, have great advantages in the growing of plants, one major problem has been created by their use. This problem involves the delivery of materials used in treating the plants and specifically fluid materials, such as plant food, water, and fumigants, to the soil adjacent the plant's roots, which soil is covered by the mulch. Many methods have been utilized in order to attempt to solve the problem of delivering various fluid materials to the plants. One system which is of primary use today is a system of aboveground piping which is utilized to spray the fluids or materials onto the mulch. This system is primarily used for delivering water to the plants.

The aboveground systems, however, have been unable to provide accurate control as to the uniformity of the delivery of the water to the plants and the water is delivered to the plants in a nonuniform manner. Thus, one plant receives more water than another which, of course, means that one plant might be watered too much or one plant might be watered too little. Moreover, since much of the water which is delivered by the aboveground spraying system falls on the plastic mulch and much is picked up by the air and blown away or evaporated, an excessive amount of water must be used to adequately water the plants. Moreover, the soil in which the plant is growing becomes relatively compact. Of course, the use of the aboveground system causes foliage and fruit on the plant to become wet and washes off any sprays which may have been sprayed on the plant. Since the fruit on the plant is wetted by the watering of the plant, a problem is often created in that the fruit becomes too wet causing molds to form on the fruit. These overhead systems, moreover, must generally be moved in order to move a tractor through the plants. From the above, it can be readily seen that the system for delivering fluids to plants now in common use has many disadvantages and greatly affects the yield from the plants.

Accordingly, the principal object of the present invention is the provision of a new and improved system for delivering fluids to plants and which is simple in construction, durable, reliable in operation, and solves or minimizes the problems, noted above, with the known systems.

An important object of the present invention is the provision of a new and improved system for delivering fluid materials to plants wherein the soil adjacent to the plants is covered by a mulch and wherein the fluid material is delivered to the plant in a uniform manner so that each plant receives substantially the same volume of fluid and, thus, all the plants receive uniform treatment.

A still further object of the present invention is the provision of a new and improved system for delivering water to plants wherein the soil adjacent to the plants is covered by a mulch in the form of a sheet of plastic material and wherein the amount of water used to water the plants is greatly reduced, there is less compaction of the soil due to the watering, and the growth of fungi and molds is minimized.

Another object of the present invention is the provision of a new, improved, simple and reliable system for delivering fluid materials to plants wherein the soil adjacent to the plants is covered by a mulch and including a fluid conduit means positioned beneath the mulch and functioning to carry fluid adjacent to the various plants and wherein the fluid conduit includes fluid openings for directing the fluid under the mulch and the various plants.

A further object of the present invention is the provision of a new and improved system for delivering fluid materials to plants which have the soil containing the roots of the plants covered by a sheet material and wherein the system includes a fluid conduit having a substantially balanced pressure throughout and orifice openings in the fluid conduit for delivering fluid in substantially uniform amounts to spaced points beneath the sheet material.

A still further object of the present invention is the provision of a new and improved fluid system for delivery of fluid materials to adjacent rows of plants which have the soil containing the roots of the plants covered by a sheet of plastic material, including separate fluid conduits extending along each of the adjacent rows and beneath the plastic material and provided with spaced openings therein for delivering fluid to spaced points beneath the plastic sheets and wherein the fluid conduits and orifice openings are sized to provide a balanced pressure system providing for uniform delivery of fluids to each plant in the row.

Further objects and advantages of the present invention will be apparent to those skilled in the art to which the invention relates from the detailed description of a preferred embodiment thereof made with reference to the accompanying drawings forming a part of this specification and in which.

The present invention relates to a system for delivering fluid materials to plants which have the soil adjacent to the plants and in which the plant roots are growing covered by a suitable mulch. The mulch may take many forms but preferably is of a black plastic sheet material which functions to reduce weed growth in the soil adjacent to the plants and minimize moisture evaporation from the soil. The fluid materials delivered to the plants by the present system may be water, plant foods, or fumigants, including fluid or gas fumigants. The preferred embodiment of the present invention, as will be described hereinbelow, relates to a fluid system for delivering water to plants and having a black plastic sheet forming the mulch therefor.

Figure 1:
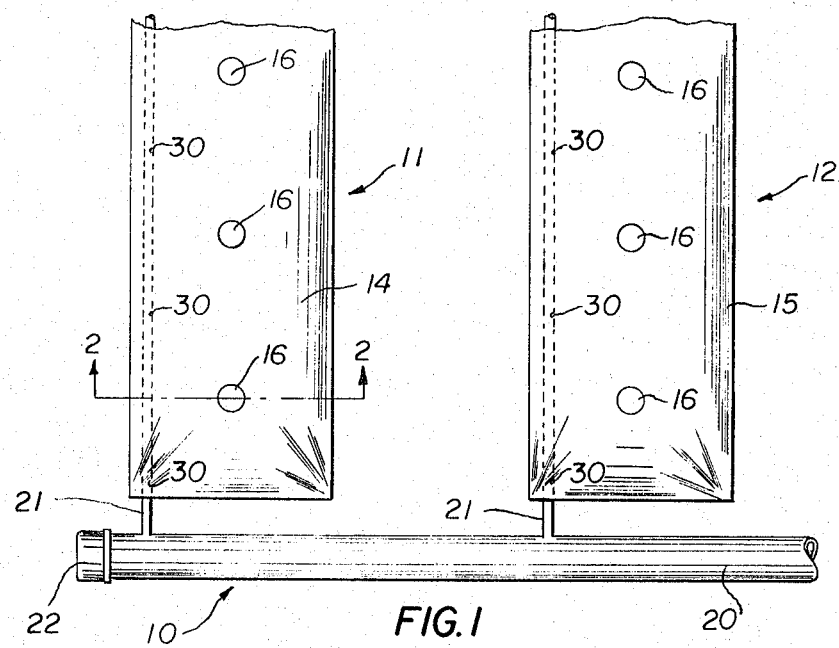
FIG. 1 is a schematic top elevational view of a plant treatment system embodying the present invention.

Referring now to FIG. 1, the preferred embodiment of the present invention includes a fluid conduit system or irrigation system 10 for delivering water to rows 11, 12 of plants 13. A mulch is associated with the plants 13 in each row and covers the soil adjacent to the plants.

The mulch, as shown in the drawings, comprises separate strips of plastic material 14, 15 for the rows 11, 12, respectively. The strips of plastic material have a plurality of spaced holes or openings 16 therein through which the stems of the plants 13 extend. The plastic sheet-like material 14, 15 covers the soil between and around adjacent plants and functions to prevent weed growth and holds moisture in the soil adjacent the roots of the plants 13.

Figure 2:
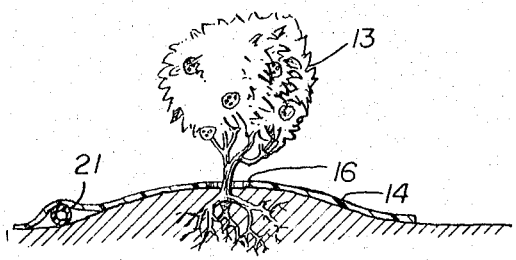
FIG. 2 is a cross-sectional view of the system shown in FIG. 1, taken approximately along the section line 2—2 of FIG. 1.

The irrigation or fluid system 10 for delivering water to the plants 13 comprises a main supply conduit or pipe 20 having a plurality of row supply conduits or pipes 21 connected therewith. The pipes are preferably made of plastic material and are commonly referred to as plastic pipe. The supply conduits 21 are equal in number to the number of rows of plants and each supply line extends adjacent to and along a row of plants. The supply conduits 21 are connected at one end with the main supply conduit 20 and lie under the plastic mulch material corresponding to its particular row, and adjacent to the roots of the plants which are covered by the plastic strips. The main supply conduit 20 is suitably blocked or capped at one end 22 and its other end is connected with a suitable source of water, such as to a pump or valve for controlling the flow of water into the main supply conduit 20. The fluid conduits 21 which lie beneath the plastic mulch and adjacent to the plants 13 may lie on or closely adjacent to the ground, or partially or wholly underground. Preferably, they lie on the ground, as shown in FIG. 2.

Figure 3:
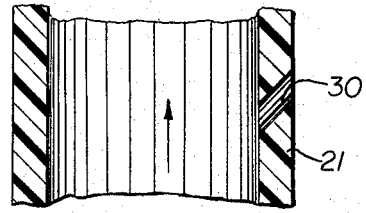
FIG. 3 is an enlarged fragmentary sectional view of a portion of the system shown in FIG. 1.

The conduits 21 are provided with a plurality of spaced orifice openings 30 which deliver water under the plastic strips 14, 15 and to the individual plants adjacent thereto. The orifice openings are preferably drilled. In order to facilitate the flow of water along the soil and around the plant in a uniform manner, the orifices 30 are slanted in the direction of fluid flow. FIG. 3 illustrates a slanted orifice 30 which is slanted at approximately 45°. Slanting the openings 30 causes the water to be directed onto the soil and in a direction outwardly of the pipes 21 and along the pipes 21. As the water flows from the openings 30, it spreads over the soil adjacent the plant roots and under the strips 14, 15.

The irrigation system 10 is constructed so as to be a balanced pressure system in that the water pressure throughout the system is substantially constant. This is achieved through the use of a particular sized supply pipe 20 in relation to particular size fluid conduits 21. Moreover, the openings 30 are a particular size in relation to the size and length of the pipe 21 in order to provide for a substantially balanced pressure system. Since the system is a balanced pressure system, the amount of water which flows from the different orifices is substantially the same and thus insures a uniform treatment of the individual plants.

The particular length and diameter of the pipes 21, 20, the specific number and spacing of pipes 21, and the particular size of the openings 30 may be readily determined to provide the desired balanced pressure. By way of example, in the preferred embodiment, the openings 30 in the pipes 21 are spaced two feet apart and are approximately 1/32 of an inch in diameter. The pipes 21 are half-inch diameter pipe and may extend for approximately 250 feet. It should be apparent that the particular size of the openings 30 and length of the pipes 20, 21 and diameter of the pipes 20 and 21 may be varied, depending upon the plants being watered, the number of plants, etc., and it is submitted that it is well within the domain of those skilled in the art to construct a balanced pressure system, once the particular needs of the individual grower are analyzed and studied.

The operation of the irrigation system 10 should be apparent from the above description. When it is desired to water the plants, water is supplied to the main supply pipe 20 either by opening the valve or starting the pump which connects the supply pipe 20 to a source of water. The water will flow throughout the system and will be directed by the orifices 30 along the soil under the plastic strips. The force with which the water flows from the orifice openings 20 will be dependent upon the pressure in the system. When it is desired to stop watering the plants, the valve or pump connected to the supply pipe 20 is operated to a closed or shut-off position. The amount of water used and the frequency of watering will be dependent upon the type of plants which are being watered and their need for water.

From the above description, it should be apparent that the irrigation system 10 provides for delivering fluid materials, and particularly water, to plants which have their roots covered by a sheet of plastic material functioning as a mulch therefor. The water or fluid materials are delivered to the individual plants in a uniform manner so that each plant receives substantially the same amount of water and, therefore, each plant receives substantially the same treatment. Through the use of the present system, overwatering and underwatering of plants is not a problem, and as a result, the growth of fungi is greatly minimized. Moreover, in view of the fact that all of the water delivered through the pipes is delivered to the soil adjacent to the roots of the plant, much less water is needed than in the known prior art systems, and, in fact, the amount of water can be reduced to as much as one-fifth. Moreover, the evaporation of the water is greatly reduced, since the water is not being sprayed in the air but is maintained relatively close to the ground and out of direct contact with the wind and sun. Moreover, the system does not apply the water in any way to the leaves or foliage and fruit of the plant being watered. Thus, the growth of fungi and molds on the fruit and foliage is greatly reduced. Moreover, since the foliage is not contacted with the water, fruit sprays, etc., are not washed off the foliage. Furthermore, there is less compaction of the soil since the water flows along the soil. As a result of all of these factors, the yield of the plants watered by the present irrigation system is greatly increased and more uniform and hardy plants are grown.

Figure 4:
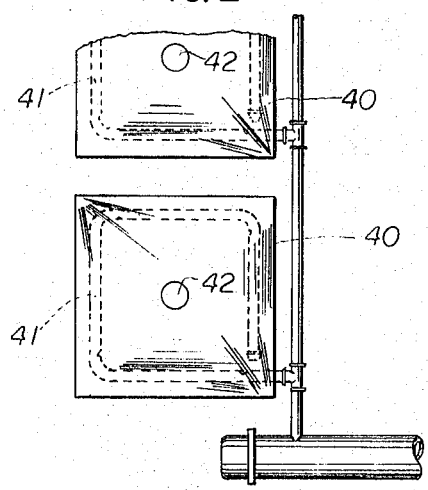
FIG. 4 is a schematic view of a modified system embodying the present invention.

A modified fluid system is shown in FIG. 4 which may be effectively used in an orchard or other area wherein the plants are of a large nature and are positioned relatively far apart. The modification shown in FIG. 4 illustrates a fluid system substantially as shown and described above with respect to FIG. 1. However, each plant, and in this case, each tree in the orchard, is surrounded by a sheet or piece of plastic strip 40 forming a mulch therefor. Fluid conduits 41 for delivering water to the plants are bent into a substantially rectangular configuration and surround the trunk of the tree which extends through an opening 42 in the sheet 40. Orifice openings 45 in the conduits 41 direct fluid flow toward the tree from all sides thereof. The size of the various openings and diameters of the pipe, etc., are constructed so as to provide a balanced pressure system so that each tree receives substantially the same volume of fluid on all sides thereof.

While the preferred embodiment of the present invention has been described above in considerable detail, it is to be understood that certain modifications, changes and adaptations may be made therein falling within the scope of the appended claim and it is intended hereby to cover all such modifications, changes and adaptations.

Having described my invention, I claim:

A system for delivering fluid to plants arranged in rows and wherein each row of plants have their roots embedded in a strip of soil comprising strips of plastic mulch covering the strips of soil in each row and being substantially impervious to moisture, each of said strips of plastic mulch having a plurality of spaced openings through which the stems of the plants extend, said openings being defined by a portion of the respective strip closely surrounding the stems of the plants, balanced pressure fluid conduit means having a substantially uniform fluid pressure throughout comprising a main fluid conduit and a plurality of connected branch conduits extending along the rows of plants and beneath said plastic mulch, said fluid conduits being made of a plastic material, each of said fluid conduits having a plurality of fluid directing orifices at spaced intervals therealong and arranged to direct uniform quantities of fluid from said conduits into said soil strips beneath said plastic mulch whereby uniform quantities of fluid are directed to each plant, said fluid directing orifices being slanted in the direction of fluid flow and disposed at 45 degrees relative to the direction of flow of fluid in the conduits.

References Cited by the Examiner

UNITED STATES PATENTS

| 1,758,767 | 5/1930 | Taggart. | |
|---|---|---|---|
| 2,771,320 | 11/1956 | Korwin | 239—279 |
| 3,205,619 | 9/1965 | Henry | 47—9 |

FOREIGN PATENTS 700,077  12/1940  Germany.

ANTONIO F. GUIDA, *Acting Primary Examiner.*

ROBERT E. BAGWILL, ABRAHAM G. STONE,
*Examiners.*